(No Model.) 2 Sheets—Sheet 2.
M. M. HOLMES.
CULTIVATOR.
No. 308,671. Patented Dec. 2, 1884.
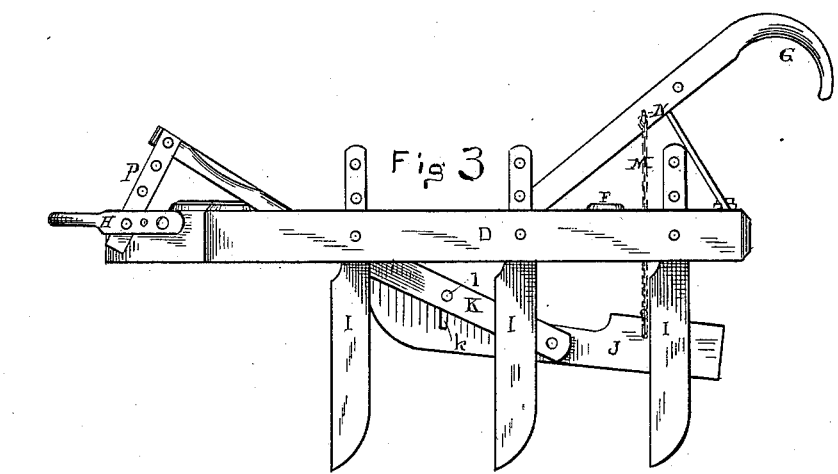
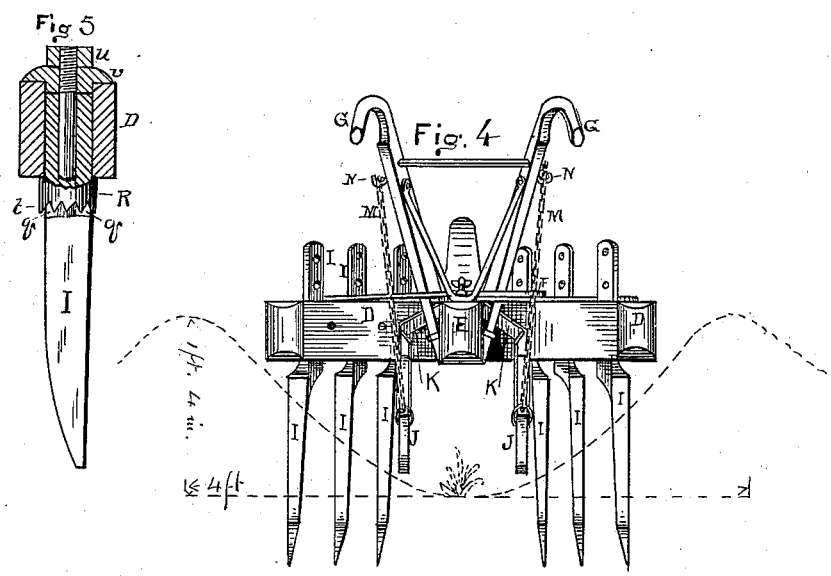
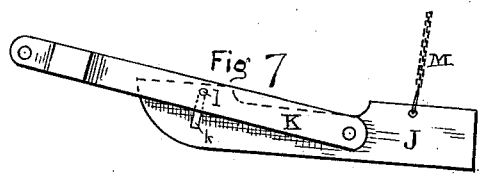
Witnesses:
J. C. Turner
J. C. Huntemann
Inventor:
Moses M. Holmes
By his Atty
B. D. Smith

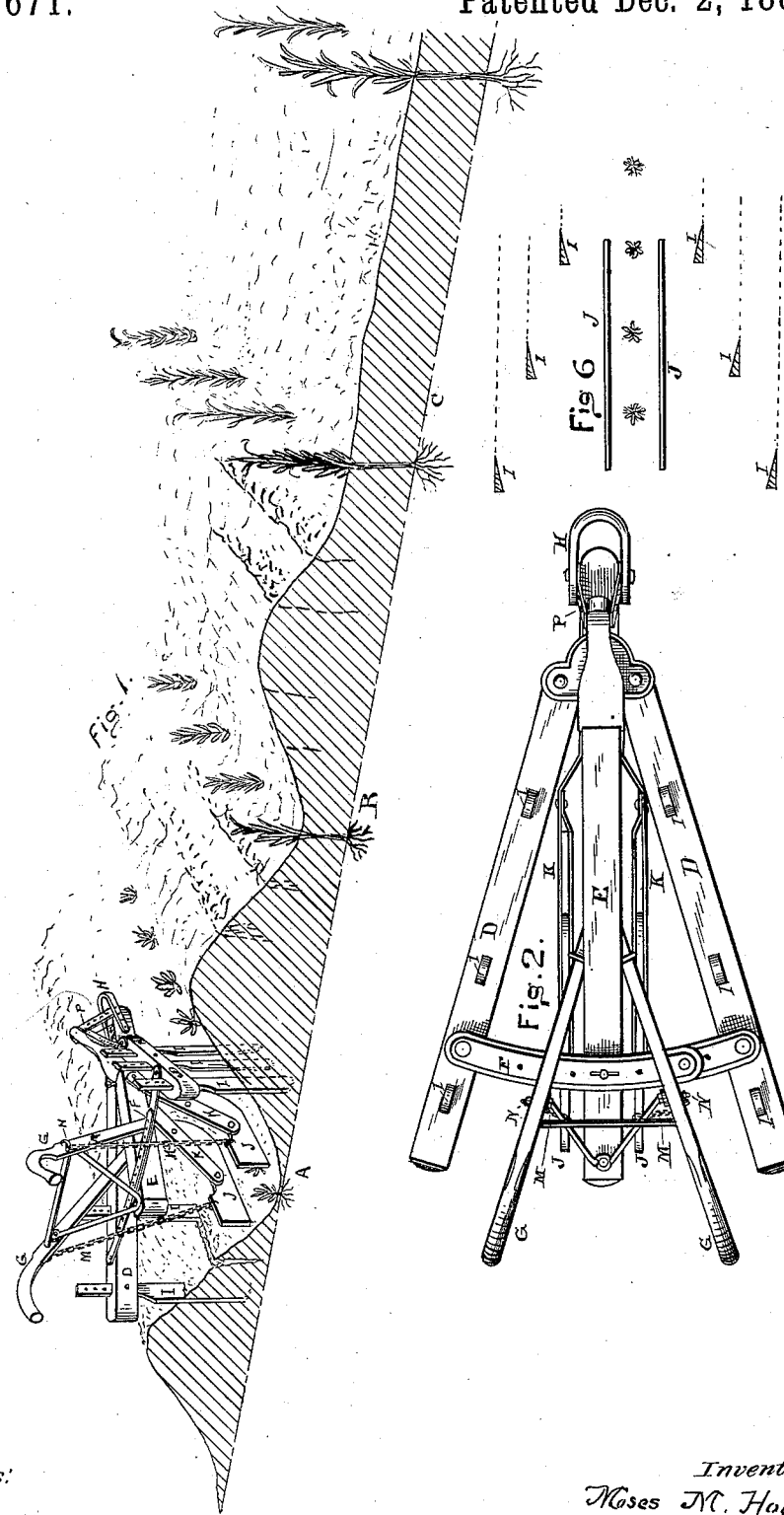

UNITED STATES PATENT OFFICE.

MOSES M. HOLMES, OF GOWER, MISSOURI.

CULTIVATOR.

SPECIFICATION forming part of Letters Patent No. 308,671, dated December 2, 1884.

Application filed June 24, 1884. (No model.)

*To all whom it may concern:*

Be it known that I, MOSES M. HOLMES, of Gower, Buchanan county, in the State of Missouri, have invented new and useful Improvements in Cultivators; and I do hereby declare that the following is a full and accurate description of the same.

My invention is adapted to a service not until recently required, and for which no implement heretofore made with vertical blades capable of penetrating the soil deeply without greatly disturbing and breaking it up is adapted.

The cultivation of maize on the high plains of Kansas and other portions of the eastern slope of the Rocky mountains has been difficult and uncertain under the methods practiced in the eastern sections of the country, because the hot climate and scarcity of rain are destructive to plants which do not send their roots deep into the soil. At the east maize is planted on the surface level, and subsequently the earth is thrown up around the growing plants, so that it stands upon a hill. The tendency of this method is to keep the roots near to the surface, and they therefore suffer readily from the drouth. In the climate of Kansas and other portions of the middle plains on the eastern slope of the Rocky mountains the summers are dry and hot, and the surface drouth is increased by the prevalence of hot dry winds. These conditions are exceeding favorable to the growth of maize, provided irrigation of the roots can be maintained. This has been accomplished within the last three or four years by planting the seed in the bottom of trenches about sixteen inches in depth, which trenches become gradually filled in the process of cultivation, so that the roots are then about eight or ten inches below the general surface, and penetrate to a sufficient depth to be secure from the effects of the ordinary drouth. The rows of plants being about four feet apart and the depth of the trenches about sixteen inches, it is manifest the sides of the trenches will be steep, and no cultivator adapted to level ground will operate thereon. It is necessary to provide an implement which will operate on the steep sloping sides and bottom of the trench, and which will break up and cultivate the ground without giving it much movement toward the growing plants. No vertical-blade cultivator heretofore made is adapted to this work or can fulfill these conditions. Therefore, while I am aware that cultivators have been made with sharp-edged blades, both vertical and to cut parallel with the surface, and that fenders have been employed to protect the plants, yet I am not aware that cultivators have ever been constructed similar in capacity for work or with any similar purpose.

Figure 1 is a perspective view showing the conformation of the ground when the young plants have begun to grow, and the effect of cultivation with my cultivator, which also is shown in operative condition. Fig. 2 is a plan of the same. Fig. 3 is a side elevation of the same. Fig. 4 is a rear elevation of the same. Fig. 5 is a sectional perspective of an adjustable and movable tooth. Fig. 6 is a plan showing the relative location of the blades and fenders. Fig. 7 is a side elevation of a fender with its attachments.

In Fig. 1 the deep trenches and intervening ridges, with the rows of young plants growing in the bottoms of the trenches, are shown at A. The effect of successive cultivations up to the time when the maize is some sixteen or eighteen inches high is shown at B and C. The trenches have then become filled by the plowing down of the ridges and the surface practically leveled, and the roots of the plants buried to the depth of eight or ten inches, and thence extending so deep into the soil as to be beyond the effects of the ordinary drouth. Thereafter the cultivation may be done with the cultivator in common use, or, if preferred, with my cultivator, with or without transposition of the teeth, or with a part or all of the blades replaced with teeth of the ordinary shovel form.

The cultivator-frame is constructed of side bars, D D, and center or draft bar, E. In order to adapt the implement to different widths between the rows, I prefer to joint the bars D at their front ends to the bar E, and provide the segment-bars F near their rear ends to enable the side bars, D, to be spread apart or brought nearer together, as may be desired, and then fastened securely in position. The handles G serve in the ordinary way for the walking attendant to guide and control the implement. The team is hitched to the clevis H. Shovel-shaped teeth are inapplicable to the purposes of this mode of cultivation, because they break up, disturb, and displace the soil too much, and would cause the plants to be buried too quickly and completely. I therefore employ long sharp-edged blades I, provided with shanks, which penetrate through the side beams D, and may be set high or low therein, as may be desired. The object of this adjustment is that, if desired, the outer blades may be set higher than the inner ones, to cause them to penetrate the soil to the same depth as the middle blades. These sharp-edged blades penetrate, break up, and separate the soil without much displacement sidewise, the air is permitted to penetrate to the roots, and by successive passages of the cultivator the soil is gradually worked down to the bottom of the trench and fills it, as shown at B and C, leaving the roots of the plants deeply buried. Fenders J J are placed between the blades and the row of plants, to protect the latter from injury by clods which, being displaced by the blades, may roll down upon the plants. Each fender J is attached to the beam E by means of an arm, K, pivoted at its front end to said beam and at its rear end to the fender, and at its rear end said fender is supported by a chain, M, preferably a little way above the surface of the ground, so that the fine dirt may pass under and the clods be arrested. The front end of the fender is rounded, so that it may readily ride upon and pass over any inequality of the ground in its path, and in so doing it may move upon its pivot or rise bodily. The range of its oscillatory motion upon its pivot is limited by a slot, $k$, and pin $l$, one of which is in the fender and the other in the arm K. If it is desirable to lift and suspend the fenders high above the ground, the chains M may be lifted and engaged with the hooks N, attached to the handle G.

When it is desired to convert this implement into an ordinary cultivator, it may be accomplished by simply transferring the teeth I to their opposite sides of the frame, and thereby reversing the deflecting-angle of the sides of the teeth, or by removing the blades I and attaching shovel-teeth. For this purpose the shovel-teeth may be provided with shanks of the same size as the teeth I; but sometimes it may be preferable to employ a larger shank, and it may also be sometimes desirable to shift or adjust the cutting-edge of the blade I so as to present its side as a deflector for the disturbed soil at a greater or less angle. I therefore provide the blade with a cylindrical shank, as shown in Fig. 5, and with one or more teeth, $q$. The shank is fitted to a cylindrical hole in a rectangular block, R, which is fitted to a mortise cut in the side bar, D. Said block is provided on its lower end with a series of radial teeth, $t$, in either one of which the tooth $q$ will fit. Said tooth may then be turned about to the position desired, and secured there by the nut $u$ at the extremity of the shank. A cap-plate, $v$, with a downward projection to fit said mortise, is also employed. When the large-shanked shovel is to be employed, the block R may be removed from the mortise by first removing the nut $u$ and plate $v$.

At the front end of the draft-bar E, I place a clevis-rack, P, having a series of perforations up and down it, whereby the clevis H may be shifted up or down and set at such a point as may be necessary to secure the proper line of draft; but a simple and easy mode of adjustment like this in one direction only is not always sufficient for the desired accuracy, and I therefore have provided the clevis-link H with a series of holes longitudinally, so that, in addition to being adjusted up and down, it is also adjustable forward and backward, and the line of draft shortened or lengthened proportionately. It is easier to lengthen or shorten the line of draft by this means than by taking up or letting out the traces of the harness, and therefore this longitudinal adjustment is very useful.

Having thus described my invention, I claim as new—

1. A straddle-row cultivator provided with long sharp-edged vertical blades I and suspended fenders J, adapted to cultivate the soil on each side of a row of plants growing along the bottom of a trench with steep sloping sides.

2. The cultivator-frame D E, combined with the long sharp-edged blades I, secured to said frame, and adapted to cultivate the soil on each side of a row of plants growing along the bottom of a trench with steep sloping sides.

3. A cultivator-frame composed of bars D D and E, jointed together at their front ends, and provided with adjusting-bars F F and handles G, combined with the long sharp-edged blades I and adjustable fenders J, adapted to cultivate the soil on each side of a row of plants growing along the bottom of a trench with steep sloping sides.

4. The blocks R, fitted to and easily removable from a mortise in the beam of the cultivator-frame, and provided with a central longitudinal perforation and radial serrations $t$, combined with a sharp-edged blade, I, provided with a cylindrical shank and teeth $q$, to engage the serrations $t$, the cap-plate $v$, and nut $u$.

5. A clevis, H, provided with means for longitudinal adjustment, combined with a clevis-rack, P, provided with means for vertical adjustment, whereby the line of draft may be varied by vertical adjustment or by variation of its length, or both.

6. The clevis-rack P, attached to the front end of the draft bar E, and provided with a series of vertical-adjustment holes, combined with the clevis-link H, provided with a series of longitudinal-adjustment holes, as set forth.

Witnesses:  MOSES M. HOLMES.
J. C. TURNER,
R. D. O. SMITH.